United States Patent
Watanabe

(10) Patent No.: US 10,873,692 B2
(45) Date of Patent: Dec. 22, 2020

(54) IMAGE PICKUP APPARATUS WITH AN OPTICAL FILTER USED FOR IN-FOCUS DETERMINATIONS

(71) Applicant: CANON KABUSHIKI KAISHA, Tokyo (JP)

(72) Inventor: Harukazu Watanabe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 276 days.

(21) Appl. No.: 15/861,770

(22) Filed: Jan. 4, 2018

(65) Prior Publication Data

US 2018/0198971 A1 Jul. 12, 2018

(30) Foreign Application Priority Data

Jan. 10, 2017 (JP) .................................. 2017-001668

(51) Int. Cl.
*G03B 13/00* (2006.01)
*H04N 5/232* (2006.01)
(Continued)

(52) U.S. Cl.
CPC ........... *H04N 5/23212* (2013.01); *G03B 3/10* (2013.01); *G03B 13/36* (2013.01); *H04N 5/2254* (2013.01); *H04N 5/23216* (2013.01)

(58) Field of Classification Search
CPC . G02B 7/28; G02B 7/36; H04N 5/232; H04N 5/225; H04N 5/238; H04N 5/23212;
(Continued)

(56) References Cited

U.S. PATENT DOCUMENTS

| 2012/0113316 A1* | 5/2012 | Ueta | G02B 7/36 |
| | | | 348/349 |
| 2012/0307134 A1* | 12/2012 | Morimoto | G02B 7/102 |
| | | | 348/360 |
| 2013/0308933 A1* | 11/2013 | Uchiyama | G03B 13/36 |
| | | | 396/125 |

FOREIGN PATENT DOCUMENTS

| JP | 2012-027156 A | 2/2012 |
| JP | 5610926 B | 10/2014 |

(Continued)

OTHER PUBLICATIONS

The above foreign patent documents were cited in the Japanese Office Action, which is enclosed with an English Translation, that issued in Japanese Patent Application No. JP2017-001668.

*Primary Examiner* — Sinh Tran
*Assistant Examiner* — Selam T Gebriel
(74) *Attorney, Agent, or Firm* — Cowan, Liebowitz & Latman, P.C.

(57) ABSTRACT

An image pickup apparatus includes an image pickup element, an optical filter, a filter driver configured to insert and to eject the optical filter into and from an optical path between the optical system and the image sensor, and a controller configured to search for an in-focus position based on the image pickup signal and to control a position of the focus lens based on a result of a search. The controller determines whether the focus lens is to move by a first amount after the optical filter moves from one of the position on the optical path and the position outside the optical path to the other, and before the search starts, based on a difference between an in-focus position when the optical filter is disposed on the optical path and an in-focus position when the optical filter is not disposed on the optical path.

15 Claims, 6 Drawing Sheets

(51) Int. Cl.
*G03B 3/10* (2006.01)
*G03B 13/36* (2006.01)
*H04N 5/225* (2006.01)

(58) Field of Classification Search
CPC .. H04N 9/04521; H04N 9/045; H04N 9/0455;
G03B 3/10; G03B 13/36; G03B 11/00;
G03B 17/02
See application file for complete search history.

(56) References Cited

FOREIGN PATENT DOCUMENTS

| | | |
|---|---|---|
| JP | 2014-225828 A | 12/2014 |
| JP | 2015-114504 A | 6/2015 |

* cited by examiner

IMAGE PICKUP APPARATUS WITH AN OPTICAL FILTER USED FOR IN-FOCUS DETERMINATIONS

BACKGROUND OF THE INVENTION

Field of the Invention

The present invention relates to an image pickup apparatus.

Description of the Related Art

In the autofocus (AF) control for an image pickup apparatus, such as a digital camera and a video camera, a TV-AF method is conventionally known for searching a focus-lens position that maximizes an AF evaluation value signal that represents a contrast state of an image signal.

In addition, one conventional image pickup apparatus performs an infrared photography by inserting an infrared cut filter into or by ejecting (retreating) it from the optical path in an image pickup optical system in the low luminance state. When the infrared cut filter is inserted into or ejected from the optical path in the image pickup optical system, the focus state may change due to the existence and nonexistence of the infrared cut filter and the resultant chromatic aberration relationship of the image pickup optical system. At this time, when the infrared cut filter is ejected while an object is focused in the visible light photography, the object significantly defocuses. It takes a long time for the TV-AF method using a position significantly distant from the in-focus position to search for a focus-lens position that maximizes the AF evaluation value signal Japanese Patent No. 5610926 discloses a method for searching for an in-focus position after moving a focus lens by a predetermined amount, where an infrared cut filter is inserted into or ejected from an optical path in an image pickup optical system.

However, when the light source for the object is a white LED as illustrated in FIG. 6A or a fluorescent lamp as illustrated in FIG. 6B does not contain a large amount of infrared light component, the in-focus position little changes even when the infrared cut filter is inserted into or ejected from the optical path in the image pickup optical system. Since the method disclosed in Japanese Patent No. 5610926 moves the focus lens by a predetermined amount in any cases and then searches for the in-focus position, it may take a long search time.

SUMMARY OF THE INVENTION

The present invention provides an image pickup apparatus that can shorten a search time for an in-focus position in inserting or ejecting an optical filter that removes at least one of infrared light and ultraviolet light.

An image pickup apparatus according to one aspect of the present invention includes an image pickup element configured to photoelectrically convert an object image formed by an optical system including a focus lens, and to generate an image pickup signal, an optical filter, a filter driver configured to insert and to eject the optical filter into and from an optical path between the optical system and the image sensor, and a controller configured to search for an in-focus position based on the image pickup signal and to control a position of the focus lens based on a result of a search. The controller determines whether the focus lens is to move by a first amount after the optical filter moves from one of the position on the optical path and the position outside the optical path to the other, and before the search starts, based on a difference between an in-focus position when the optical filter is disposed on the optical path and an in-focus position when the optical filter not disposed on the optical path.

Further features of the present invention will become apparent from the following description of exemplary embodiments with reference to the attached drawings.

DESCRIPTION OF THE EMBODIMENTS

Figure 1:
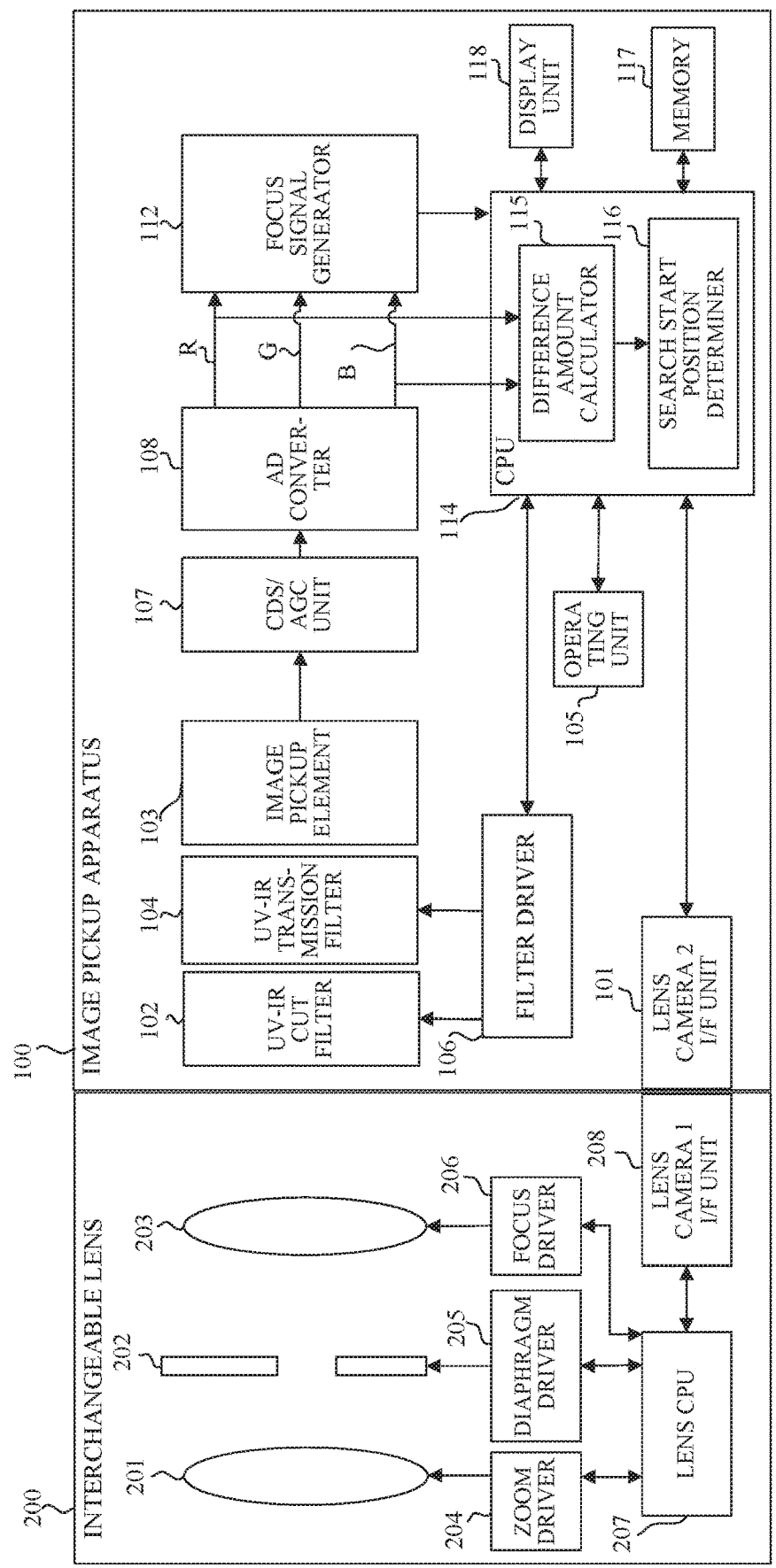
FIG. 1 is a block diagram of a camera system according to first and second embodiments.

A description will be given of embodiments of the present invention with reference to the accompanying drawings. Corresponding elements in each figure will be designated by the same reference numerals, and a description thereof will be omitted.

First Embodiment

Referring now to FIG. 1, a description will be given of a camera system according to this embodiment. FIG. 1 is a block diagram of a camera system. The camera system includes an image pickup apparatus 100 and an interchangeable lens 200 detachably attached to the image pickup apparatus 100. While the interchangeable lens 200 includes an image pickup optical system and is detachably attached to the image pickup apparatus 100, the present invention is not limited to this embodiment. The image pickup optical system may be integrated into the image pickup apparatus 100.

A description will now be given of the interchangeable lens 200. The interchangeable lens 200 includes a zoom lens unit 201, a diaphragm (aperture stop) 202, and a focus lens unit 203. The focus lens unit 203 is an optical element that moves along the optical axis so as to displace an imaging position of the interchangeable lens 200, and can change an object distance. The focus lens unit 203 corrects a displacement of the imaging position where the zoom lens unit 201 is moved along the optical axis.

Since the interchangeable lens 200 is a rear focus type zoom lens in this embodiment, the focus lens unit 203 is disposed on the image pickup side of the zoom lens unit 201. In case of the front focus type zoom lens and the front inner focus type zoom lens, the focus lens unit 203 is disposed on the object side of the zoom lens unit 201, but the following effects are similarly applied. The zoom lens unit 201 may be a single-focus lens for the similar effects.

The interchangeable lens 200 includes a zoom driver 204 that moves the zoom lens unit 201, a diaphragm driver 205 that drives the diaphragm 202, and a focus driver 206 that drives the focus lens unit 203. Each driver includes an actuator, such as a stepping motor, a DC motor, and an ultrasonic motor.

The interchangeable lens 200 receives a command signal, such as a zoom, a focus, and a diaphragm, via a lens camera 1 interface unit 208 from the image pickup apparatus 100, and includes a lens CPU 207 that controls each driver. The lens CPU 207 sends lens information, such as lens ID of the interchangeable lens 200, a current zoom position, focus position, and diaphragm position, to the image pickup apparatus 100 via the lens/camera 1 interface unit 208.

Next follows a description of a configuration of the image pickup apparatus 100. A CPU 114 sends a command signal relating to the zoom, focus, diaphragm, etc. to the interchangeable lens 200 via the lens/camera 2 interface unit 101. The CPU 114 receives the lens information, such as lens ID, a current zoom position, focus position, and diaphragm position from the interchangeable lens 200 via the lens/camera 2 interface unit 101.

A UV-IR cut fitter 102 is an optical filter that removes ultraviolet (UV) and infrared (IR) light components in the incident light component from the interchangeable lens 200, and transmits light only in the wavelength range from 410 nm to 680 nm. An image pickup element (or image sensor) 103 includes a CCD sensor, a CMOS sensor, etc., photo-electrically converts an object image (optical image) formed by the interchangeable lens 200, and outputs an analog signal. A UV-IR transmission filter 104 is an optical filter that transmits light in a wavelength range (350 nm to 1100 nm) from the near UV to the near IR receivable by the image sensor 103 in the incident component from the interchangeable lens 200.

The UV-IR cut filter 102 and the UV-IR transmission filter 104 are inserted into and ejected (or retreated) from the optical path in the image pickup optical system. More specifically, in the visible light photography, the UV-IR cut filter 102 is inserted into the optical path in the image pickup optical system, and the UV-IR transmission filter 104 is ejected from the optical path in the image pickup optical system. In the photography from the near UV light to the near IR light, the UV-IR cut filter 102 is ejected from the optical path in the image pickup optical system, and the UV-IR transmission filter 104 is inserted into the optical path in the image pickup optical system. This configuration also adjusts the optical path to the image pickup element 103. The UV-IR transmission filter 104 may be replaced with a UV cut IR transmission filter that removes the UV light component and transmits light from the visible range to the IR range. The UV-IR transmission filter 104 may also be replaced with a UV transmission and IR cut filter that removes the IR light component and transmits light from the near UV range to the visible range.

An operating unit 105 includes a plurality of push buttons and a cross key, and is used to change camera settings, such as a gain and a shutter. The operating unit 105 includes a push button switch that inserts the UV-IR cut filter 102 and the UV-IR transmission filter 104 into and elects them from the optical path in the image pickup optical system.

A filter driver 106 inserts the UV-IR cut filter 102 and the UV-IR transmission filter 104 into and eject them from the optical path in the image pickup optical system based on the command from the CPU 114. The CPU 114 in this embodiment drives the filter driver 106 when the preset push button switch is pushed in the operating unit 105, but may automatically drive the filter driver 106 in accordance with the luminance of the incident light onto the image pickup element 103. More specifically, the CPU 114 may drive the filter driver 106 based on the F-number, the gain value, the shutter speed value, and the luminance calculated from the output value of the image pickup element 103.

A CDS/AGC unit 107 removes a noise superimposed on an analog signal from the image pickup element 103 and automatically adjusts a gain. An AD converter 108 samples the signal from the CDS/AGC unit 107 and converts it into a digital signal. In this embodiment, the CDS/AGC unit 107 and the AD converter 108 are provided separately from the image pickup element 103, but may be provided in the image pickup element 103.

Figure 2:
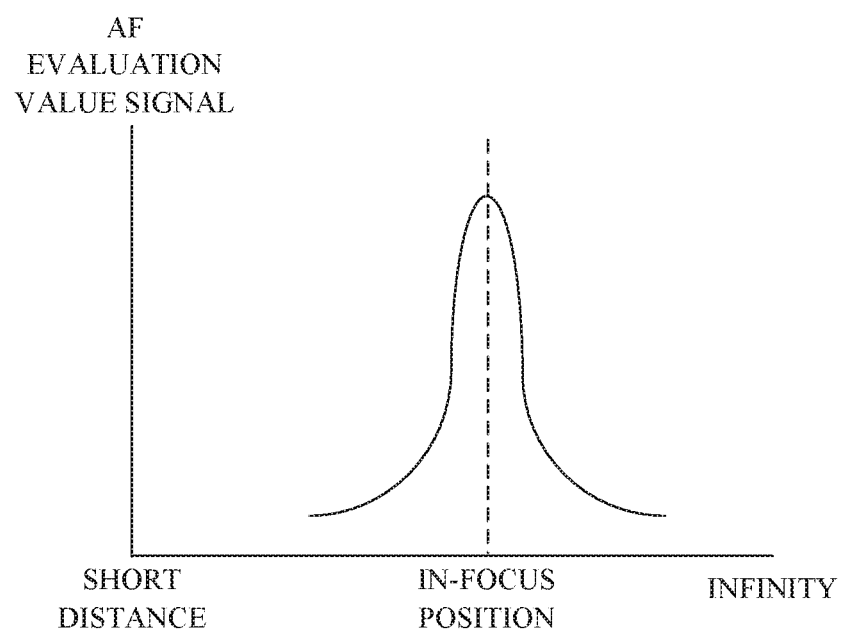
FIG. 2 illustrates one example of an AF evaluation value signal.

A focus signal generator 112 receives a RGB signal in a preset range used for a focus detection in the image in the RGB signal of the image output from the AD converter 108. It is likely that the object at the center part in the image is focused in the autofocus control, and this embodiment sets the preset area used for the focus detection to the center part in the image. The focus signal generator 112 extracts only a high frequency component in the received RGB signal with a high-pass filter (HPF), and thereafter generates an AF evaluation value signal (focus signal) illustrated in FIG. 2 by extracting a difference between the maximum value and the minimum value of the luminance value. The AF evaluation value signal is input to the CPU 114.

The CPU (controller) 114 sends to the interchangeable lens 200, a position that maximizes the AF evaluation value signal or a command signal for moving the focus lens unit 203 to the in-focus position focused on the object (mountain-climbing TV-AF). In other words, the CPU 114 performs focusing by moving the focus lens unit 203. The CPU 114 receives the R signal and the B signal in the RGB signal from the AD converter 108. Where the UV-IR transmission filter 104 is replaced with the UV cut and IR transmission filter that transmits the light from the visible range to the IR range and removes the UV light component, the AD converter 108 may not output the B signal to the CPU 114. Where the UV-IR transmission filter 104 is replaced with the UV transmission and IR cut filter that transmits the light from the near UV range to the visible range and removes the IR light component, the AD converter 108 may not output the R signal to the CPU 114.

The CPU 114 includes a difference amount calculator 115 and a search start position determiner 116. The difference amount calculator 115 calculates a difference amount between luminance values of the R and B signals where the UV-IR cut filter 102 is inserted into or ejected from the optical path in the image pickup optical system. That the UV-IR cut filter 102 is inserted into or ejected from the optical path in the image pickup optical system means that before and after the UV-IR cut filter 102 is ejected from the optical path in the image pickup optical system or before and after the UV-IR cut filter 102 is inserted into the optical path. Before and after the UV-IR cut filter 102 is ejected from the optical path in the image pickup optical system means before and after the UV-IR transmission filter 104 is inserted into the optical path in the image pickup optical system. Before and after the UV-IR cut filter 102 is inserted into the optical path in the image pickup optical system means before and after the UV-IR transmission filter 104 is ejected from the optical path in the image pickup optical system. The search start position determiner 116 determines based on the difference amount calculated by the difference amount calculator 115, whether the start position used to search for the in-focus position of the focus lens unit 203 is to change or whether the focus lens unit 203 is to move before focusing. The search start position determiner 116 sends the command signal used to drive the focus lens unit 203 to the lens PUC 207 where the start position used to search for the in-focus position of the focus lens unit 203 is to change.

A memory 117 stores an average value of the luminance values of the R and B signals, a focus position, an in-focus position (tracking curve) etc. on the basis of the visible light for each attachable interchangeable lens. The memory 117 stores, as a moving amount from the position based on the visible light photography, a focal length and an in-focus position in the near IR light photography and near UV light photography.

Figure 3:
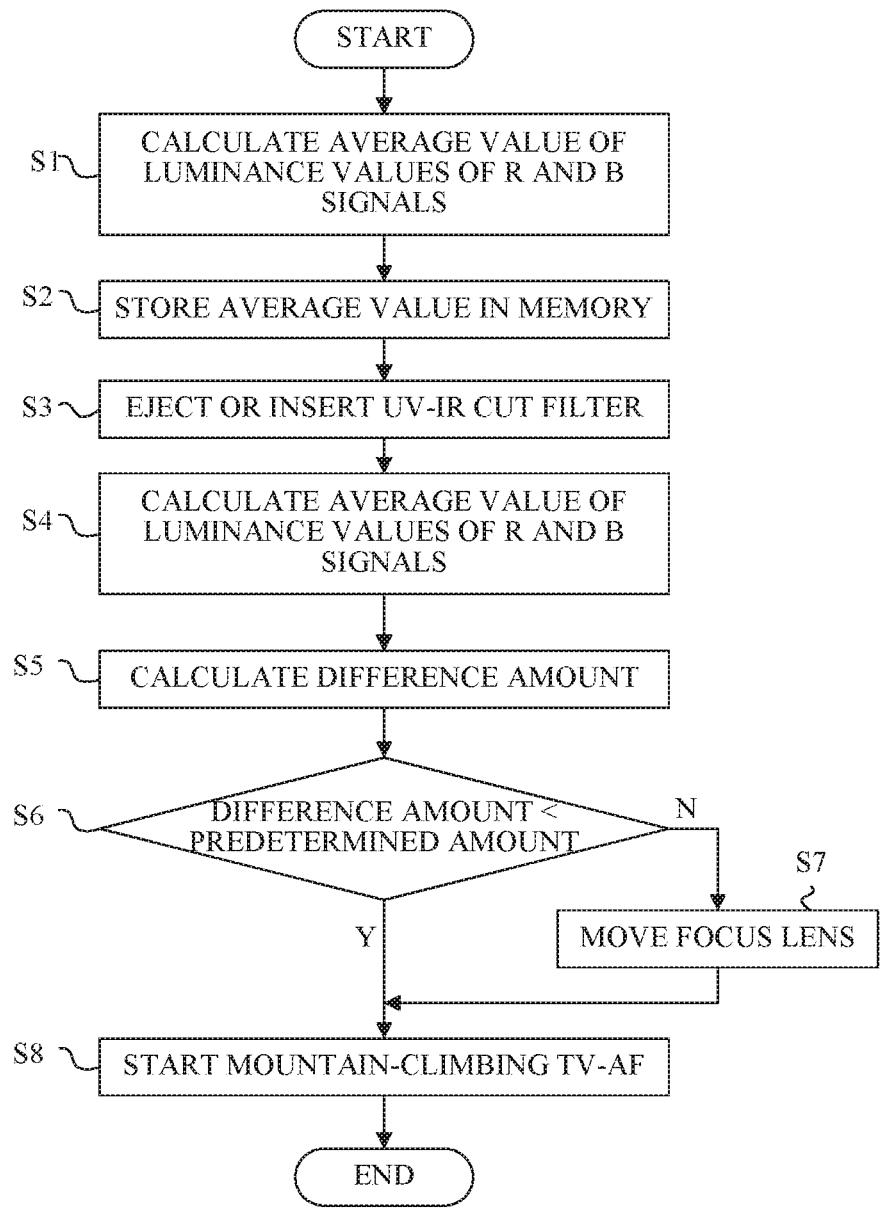
FIG. 3 is a flowchart of a process necessary to start searching an in-focus position according to the first embodiment.

Referring now to a flowchart in FIG. 3, a description will be given of processing before a search for the in-focus position starts where the UN-IR cut filter 102 is inserted into or elected from the optical path in the image pickup optical system. FIG. 3 is a flowchart of processing before a search for the in-focus position starts. The CPU 114 executes the processing of this embodiment in accordance with a processing program as a computer program that runs on software with hardware. The processing program may be stored in a non-transitory computer-readable storage medium etc. The CPU 114 executes the above processing in this embodiment, but a personal computer (PC) or a dedicated apparatus as a processing unit may execute the processing according to this embodiment. Alternatively, a circuit corresponding to the processing program according to this embodiment may be provided and operated so as to execute the processing of this embodiment.

Before the CPU 114 executes this processing, or before the UV-IR cut filter 102 is inserted into or ejected from the optical path in the image pickup optical system, the image pickup apparatus 100 has an in-focus state in which the object is focused. In this state, when the preset push button switch is pushed in the operating unit 105 so as to insert the UV-IR cut filter 102 into or to eject it from the optical path in the image pickup optical system, this processing starts. In this embodiment, a description will be given of an example in which the UV-IR cut filter 102 that has been inserted into the optical path in the image pickup optical system is ejected from the optical path in the image pickup optical system or in which the UV-IR cut filter 102 that has been elected from the optical path is inserted into the optical path in the image pickup optical system.

In the step S1, the CPU 114 calculates an average value of the luminance values of the R signal and the B signal just before the UV-IR cut filter 102 is inserted into or ejected from the optical path. In other words, before the UV-IR cut filter 102 is ejected from the optical path, the CPU 114 calculates the average value of the luminance values just before it is ejected from the optical path, and before the UV-IR cut filter 102 is inserted into the optical path, the CPU 114 calculates the average value the luminance values just before it is inserted into the optical path.

In the step S2, the CPU 114 stores the average value calculated in the step S1 in the memory 117.

In the step S3, the CPU 114 inserts the UV-IR cut filter 102 into or ejects it from the optical path in the image pickup optical system by using the filter driver 106.

In the step S4, the CPU 114 calculates the average value of the luminance values of the R signal and the B signal just after the UV-IR cut filter 102 is inserted into or ejected from the optical path in the image pickup optical system. In other words, the CPU 114 calculates the average value the luminance values just after the UV-IR cut filter 102 is ejected from the optical path where it is ejected from the optical path, or just after the UV-IR cut filter 102 is inserted into the optical path where it is inserted into the optical path.

In the step S5, in accordance with the characteristic of the optical filter, the difference amount calculator 115 calculates at least one of a first difference value and a second difference value between the average value of the luminance values of the R and B signals where the UV-IR cut filter 102 is inserted into or ejected from the optical path. More specifically, the first difference amount is a difference amount between the average value of the luminance values of the R signal calculated in the step S2 and the average value of the luminance values of the R signal calculated in the step S4. The second difference amount is a difference value between the average value of the luminance values of the B signal calculated in the step S2 and the average value of the luminance values of the B signal calculated in the step S4. In the following description, the difference amount calculator 115 calculates the first and second difference amounts.

In the step S6, the search start position determiner 116 determines whether the difference amount calculated in the step S5 is smaller than a predetermined amount. More specifically, the search start position determiner 116 determines whether the first difference amount smaller than a first predetermined amount and the second difference amount is smaller than a second predetermined amount. When the first difference amount is smaller than the first predetermined amount and the second difference amount is smaller than the second predetermined amount, the search start position determiner 116 determines that the light source for the object includes few IR and UV light components as in the white LED or the fluorescent lamp. In this case, the search start position determiner 116 determines that the position of the focus lens unit 203 is not to change or the focus lens unit 203 is not to move just before the UV-IR cut filter 102 is ejected from or inserted into the optical path in the image pickup optical system. At this time, the flow proceeds to the step S8.

On the other hand, when the first difference amount is equal to or larger than the first predetermined amount or the second difference amount is equal to or larger than the second predetermined amount, the search start position determiner 116 determines that the light source for the object contains a large amount of IR or UV light components. In this case, the search start position determiner 116 determines that the position of the focus lens unit 203 is to change or the focus lens unit 203 is to move just before the UV-IR cut filter 102 is ejected from or inserted into the optical path in the image pickup optical system. At this time, the flow proceeds to the step S7.

In this embodiment, when the first and second difference amounts are equal to the first and second predetermined amounts, the flow proceeds to the step S7 but may proceed to the step S8.

In the step S7, the CPU 114 outputs the command signal to the lens CPU 207 so as to move the focus lens unit 203 to the infinity side or the short distance side of the position of the focus lens unit 203 just before the focus lens unit 203 is ejected from the optical path or inserted into the optical path in the image pickup optical system. An amount (predetermined moving amount) by which the focus lens unit 203 is to move is previously stored in the memory 117 for each attachable lens. The CPU 114 may obtain an amount of moving the focus lens unit 203 via the external recording medium and the network.

Where the first difference amount is equal to and larger than the first predetermined amount in ejecting the UV-IR cut filter 102 that has been inserted into the optical path in the image pickup optical system, from the optical path, the CPU 114 moves the focus lens unit 203 to the in-focus position with a predetermined wavelength in the IR range, such as 850 nm. On the other hand, the first difference amount is equal to and larger than the first predetermined amount in inserting the UV-IR cut filter 102 that has been ejected from the optical path in the image pickup optical system, into the optical path, the CPU 114 moves the focus lens unit 203 to the in-focus position with a predetermined wavelength in the visible range, such as 530 nm.

Where the second difference amount is equal to and larger than the second predetermined amount in ejecting the UV-IR cut filter 102 that has been inserted into the optical path in the image pickup optical system, from the optical path, the CPU 114 moves the focus lens unit 203 to the in-focus position with a predetermined wavelength in the UV range, such as 375 nm. On the other hand, the second difference amount equal to and larger than the second predetermined amount in inserting the UV-IR cut filter 102 that has been ejected from the optical path in the image pickup optical system, into the optical path, the CPU 114 moves the focus lens unit 203 to the in-focus position with a predetermined wavelength in the visible range, such as 530 nm.

Where the first and second difference amounts are larger than the first and second predetermined amounts, an amount of the visible light component in the light from the light source, such as sun light, for the object is usually large. In this case, even when the optical filter is inserted into or ejected from the optical path in the image pickup optical system, the in-focus position little changes. Hence, the CPU 114 may fix the focus lens unit 203 or make movable the focus lens unit 203 to the in-focus position with the visible range wavelength, such as 530 nm. The CPU 114 may follow the above operation with a larger difference amount. When the first and second difference amounts are equal to each other, the CPU 114 may move the focus lens unit 203 to the in-focus position in the visible range, such as 530 nm.

In the step S8, the CPU 114 starts the mountain-climbing TV-AF that drives the focus lens unit 203 so as to maximize the AF evaluation signal in the mountain-climbing TV-AF, an AF evaluation value is obtained based on a captured signal obtained at each position while the focus lens unit 203 is scanned, and an in-focus position of the focus lens that provides a maximum value of the AF evaluation value is detected.

When the first and second difference amounts are smaller than the first and second predetermined values in the step S6, the position of the focus lens unit 203 little changes before and after the UV-IR cut filter 102 is ejected from or inserted into the optical path in the image pickup optical system. Hence, the search time can become shorter when the in-focus position is searched for from the position of the focus lens unit 203 just before the UV-IR cut filter 102 is ejected from or inserted into the optical path in the image pickup optical system.

When the first difference amount is equal to or larger than the first predetermined amount or the second difference amount is equal to or larger than the second predetermined amount in the step S6, the position of the focus lens unit 203 significantly changes before and after the UV-IR cut filter 102 is ejected from or inserted into the optical path in the image pickup optical system. Hence, the search time can be reduced by searching for the in-focus position after the focus lens unit 203 is moved by a predetermined moving amount. The predetermined moving amount may be larger than the scanning distance in the mountain-climbing TV-AF.

As described above, this embodiment determines based on the difference amount between the luminance values of the R signal and the B signal where the UV-IR cut filter 102 is inserted into or ejected from the optical path in the image pickup optical system, whether the search position used to search for the in-focus position is to change. Thereby, the search time of the in-focus position can be reduced.

Figure 4:
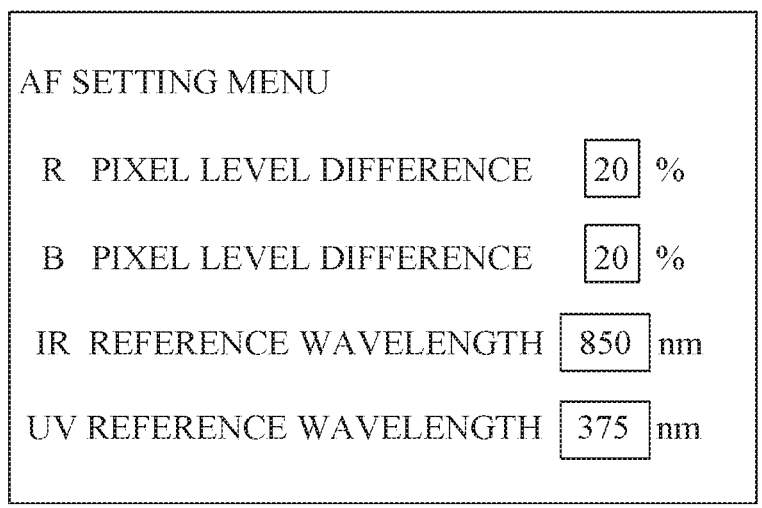
FIG. 4 illustrates one example of a setting screen.

The user may arbitrarily set the first and second predetermined amounts used for the step S6. This embodiment can the first and second predetermined amounts by changing a ratio to a predefined amount. More specifically, while a setting screen illustrated in FIG. 4 displayed on a display unit 118, such as a liquid crystal panel, is viewed, the ratios (R Pixel Level Difference, B Pixel Level. Difference) may be set with the operating unit 105.

The user may arbitrarily set the predetermined moving amount of the focus lens unit 203 used for the step S7. More specifically, while the setting screen illustrated in FIG. 4 viewed, the reference wavelengths (IR Reference Wavelength, UV Reference Wavelength) may be set with the operating unit 105. The CPU 114 may calculate each of the focal length and the in-focus position with each reference wavelength as a moving amount for the visible light and from the reference position.

In this embodiment, the operating unit 105 and the display unit 118 serve as a setting unit that can set at least one of the first and second predetermined amounts and the predetermined moving amount, but the present invention is not limited this embodiment. For example, at least one of the first and second predetermined amounts and the predetermined moving amount may be set by directly operating the items displayed on the display unit 118. In other words, the display unit 118 may serves as the setting unit.

Second Embodiment

A camera system according to this embodiment similarly configured as that in the first embodiment.

The first embodiment determines whether the start position used to search for the in-focus position is to change, based on the difference amount between the average values of the luminance values of the R and B signals where the UV-IR cut filter 102 is inserted into or ejected from the optical path in the image pickup optical system.

This embodiment determines whether the start position used to search for the in-focus position is to change, based on the lens information of the attached lens as well as the difference amount.

Figure 5:
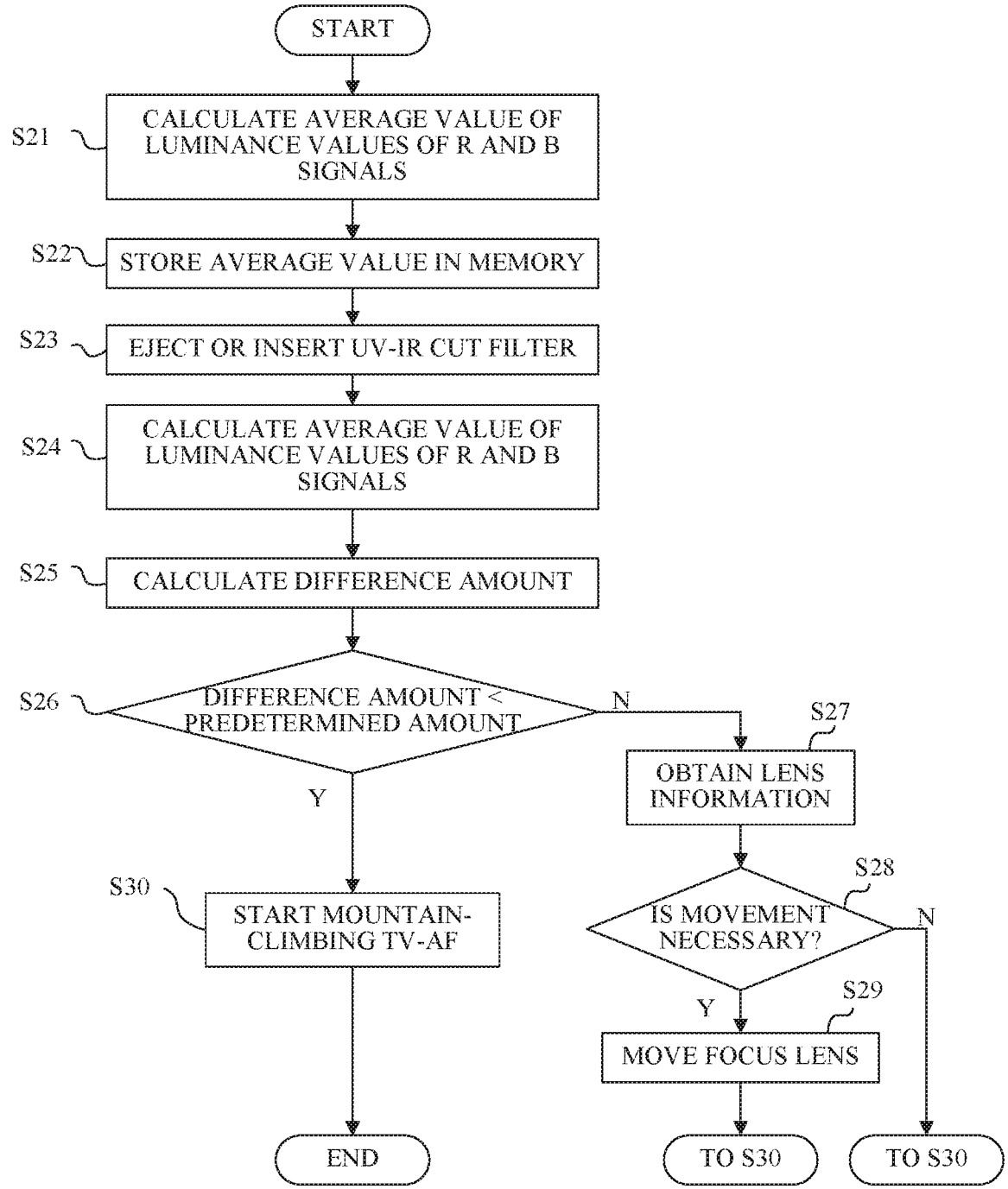
FIG. 5 is a flowchart of a process necessary to start searching an in-focus position according to the second embodiment.
Figures 6A, 6B:
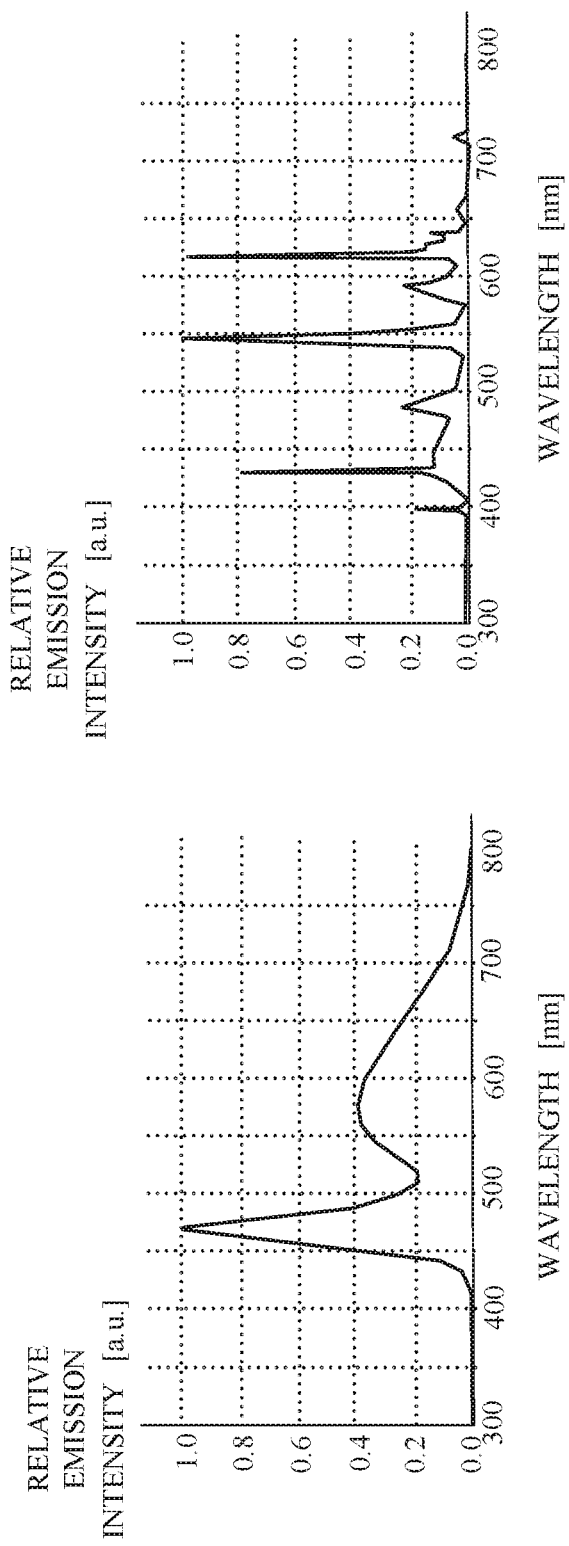
FIG. 6A illustrates a spectral characteristic example of a white LED.
FIG. 6B illustrates a spectral characteristic example of a fluorescent lamp.

Referring now to a flowchart illustrated in FIG. 5, a description will be given of processing before a search for an in-focus position starts where the UV-IR cut filter 102 is inserted into or ejected from the optical path in the image pickup optical system. FIG. 5 is a flowchart of the processing before the search for the in-focus position starts. The CPU 114 executes the processing of this embodiment in accordance with a processing program as a computer program that runs on software with hardware. The processing program may be stored in a non-transitory computer-readable storage medium, etc. The CPU 114 executes the processing in this embodiment, but a personal computer (PC) or a dedicated apparatus as a processing unit may execute the processing according to this embodiment. Alternatively, a circuit corresponding to the processing program according to this embodiment may be provided and operated so as to execute the processing of this embodiment.

The steps S21 to S26, S29 and S30 are the same as the steps S1 to S8 in the first embodiment, and thus a description thereof will be omitted.

In the step S27, the CPU 114 obtains the lens information from the lens CPU 207. Herein, the lens information contains the type of the interchangeable lens 200 (the type of the image pickup optical system), the current F-number, focal length, aberration information in the near UV range to the near IR range, etc.

In the step S28, the search start position determiner 116 determines based on the first and second difference amount, and the lens information, whether the search position used to search for the in-focus position of the focus lens unit 203 is to change or the focus lens unit 203 is to move. When the search start position determiner 116 determines that it is necessary to move the focus lens unit 203, the flow proceeds to the step S29, and when the search start position determiner 116 determines that it is unnecessary to move the focus lens unit 203, the flow proceeds to the step S30. For example, when the F-number is large (or the aperture is narrow) on the wide-angle side, the depth of field is deep, the in-focus position little changes, and it is thus unnecessary to move the focus lens unit 203. Some recent lenses have no aberrations for light from the near UV range to the near IR range, and it is unnecessary to move the focus lens unit 203 in this case.

As described above, this embodiment determines whether the start position used to search for the in-focus position is to change, based on the difference amount between the average amounts of the luminance values of the R and B signals and the lens information where the UV-IR cut filter 102 is inserted into or ejected from the optical path in the image pickup optical system. Thereby, the search time of the in-focus position can be further reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-001668, filed on Jan. 10, 2017, which is hereby incorporated by reference herein in its entirety.

What is claimed is:

1. An image pickup apparatus comprising:
an image sensor configured to photoelectrically convert an object image formed by an optical system including a focus lens, and to generate an image pickup signal;
an optical filter;
an actuator configured to insert and to eject the optical filter into and from an optical path between the optical system and the image sensor; and
at least one processor or circuit programmed to function as a controller configured to search for an in-focus position based on the image pickup signal and to control a position of the focus lens based on a result of a search,
wherein the controller determines whether the focus lens is to move by a first amount after the optical filter moves from one of the position on the optical path and the position outside the optical path to the other, and before the search starts, based on a difference between an in-focus position when the optical filter is disposed on the optical path and an in-focus position when the optical filter is not disposed on the optical path, and
wherein the controller searches for the in-focus position after moving the focus lens by the first amount when the difference is larger than a threshold, and searches for the in-focus position from a position of the focus lens before the optical filter is moved when the difference is smaller than the threshold.

2. The image pickup apparatus according to claim 1, wherein the controller estimates the difference based on the image pickup signal.

3. The image pickup apparatus according to claim 1, wherein the optical filter removes at least one of an infrared light component and an ultraviolet light component.

4. The image pickup apparatus according to claim 1, wherein the image pickup signal is a RGB signal, and
wherein the controller estimates the difference based on a difference amount between a value representing a luminance of an R signal in the RGB signal when the optical filter is inserted into the optical path and a value representing a luminance of the R signal in the RGB signal when the optical filter is disposed on the position outside the optical path.

5. The image pickup apparatus according to claim 4, wherein the value representing the luminance of the R signal is an average value of luminance values of the R signal.

6. The image pickup apparatus according to claim 1, wherein the image pickup signal is a RGB signal, and
wherein the controller estimates the difference based on a difference amount between a value representing a luminance of an B signal in the RGB signal when the optical filter is inserted into the optical path and a value representing a luminance of the B signal in the RGB signal when the optical filter is disposed on the position outside the optical path.

7. The image pickup apparatus according to claim 6, wherein the value representing the luminance of the B signal is an average value of a luminance value of the B signal.

8. The image pickup apparatus according to claim 1, wherein the first amount is a predetermined amount.

9. The image pickup apparatus according to claim 1, wherein the controller determines whether the focus lens is to move by the first amount before the search is performed, based on at least one of a current F-number, a current focal length, and aberration information of the optical system.

10. The image pickup apparatus according to claim 1, wherein the controller searches for the in-focus position by obtaining information on a contrast of the image pickup signal while scanning a focus position every second amount smaller than the first amount.

11. An image pickup apparatus comprising:
an image sensor configured to photoelectrically convert an object image formed by an optical system including a focus lens, and to generate an image pickup signal; an optical filter;
an actuator configured to insert and to eject the optical filter into and from an optical path between the optical system and the image sensor; and
at least one processor or circuit programmed to function as a controller configured to search for an in-focus position based on the image pickup signal and to control a position of the focus lens based on a result of a search,
wherein the controller determines whether the focus lens is to move by a first amount after the optical filter moves from one of the position on the optical path and the position outside the optical path to the other, and before the search starts, based on an estimation result of a type of a light source for illuminating an object, and
wherein the controller searches for the in-focus position from a position of the focus lens before the optical filter is moved when a ratio of a component cut by the optical filter included in components of light illuminated from the light source is large.

12. The image pickup apparatus according to claim 11, wherein the controller searches for the in-focus position after moving the focus lens by the first amount when the difference is larger than a threshold, and searches for the in-focus position from a position of the focus lens before the optical filter is moved when the difference is smaller than the threshold.

13. The image pickup apparatus according to claim 11, wherein the optical filter removes at least one of an infrared light component and an ultraviolet light component.

14. The image pickup apparatus according to claim 11, wherein the first amount is a predetermined amount.

15. The image pickup apparatus according to claim 11, wherein the controller searches for the in-focus position by obtaining information on a contrast of the image pickup signal while scanning a focus position every second amount smaller than the first amount.

* * * * *